(No Model.)

D. L. KEELER.
MIXER FOR PUG MILLS.

No. 513,018. Patented Jan. 16, 1894.

WITNESSES:
Emily C. Mohl.
Fred T. Howell

INVENTOR
David L. Keeler
BY
Dennis L. Rogers
ATTORNEY.

THE NATIONAL LITHOGRAPHING COMPANY,
WASHINGTON, D. C.

United States Patent Office.

DAVID L. KEELER, OF GRAND RAPIDS, MICHIGAN.

MIXER FOR PUG-MILLS.

SPECIFICATION forming part of Letters Patent No. 513,018, dated January 16, 1894.

Application filed March 20, 1893. Serial No. 466,942. (No model.)

*To all whom it may concern:*

Be it known that I, DAVID L. KEELER, a citizen of the United States, residing at Grand Rapids, in the county of Kent and State of Michigan, have invented certain new and useful Improvements in Mixers for Pug-Mills; and I do hereby declare the following to be a full, clear, and exact description of the invention, such as will enable others skilled in the art to which it appertains to make and use the same.

My invention relates to a mixer and conveyer for a pug mill, for instance, and it consists in the peculiar construction and the combination, arrangement and adaptation of the various parts, hereinafter described and more particularly pointed out in the claim, reference being had to the accompanying drawings, wherein—

Figure 1:
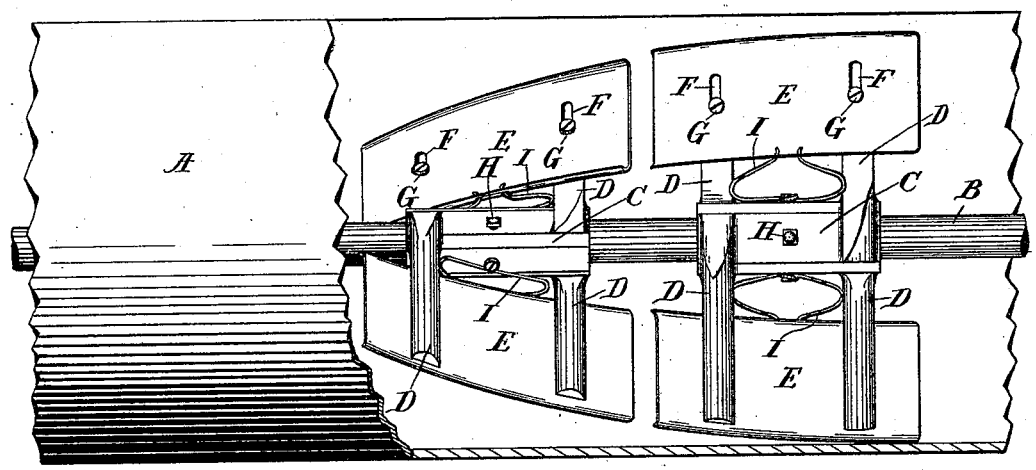
Figure 2:
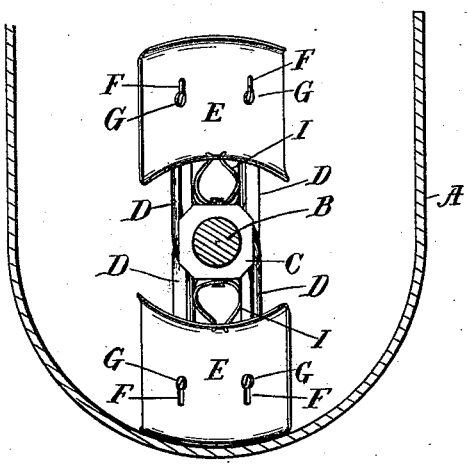

Figure 1, is a side elevation of a section of a device embodying my invention, with part of the side of the trough broken away, and Fig. 2, the same in cross section, showing the mixer in end elevation.

Like letters indicate like parts throughout the drawings.

A. represents any suitable trough, or it may be the casing of a pug mill having journaled longitudinally, centrally therein, a shaft B. on which are placed one or more hubs C. having radial arms D. arranged in pairs, upon opposite sides thereof, one of each pair upon one corner of the hub, and its mate diagonally across upon the opposite diagonal corner, so that one arm of each pair is upon the opposite side of the shaft from its mate.

Supported upon each pair of arms is a wing E. preferably of sheet metal, and having a slightly turned edge or flange upon the opposite sides thereof, and provided with a spring I. and attached to arms D. by bolts or screws G. arranged in slots F. by means of which the said wings are automatically, vertically adjustable, for conforming themselves to inequalities in the surface of the trough or extension of the arms by heat. Two or more of these hubs are strung upon the shaft B. and secured thereon by set screw H. When intended to be used as a conveyer, these hubs are so arranged as to form a screw conveyer, the wings being so placed with relation to each other as to form substantially a continuous spiral flange, extending from one end of the trough to the other. Power being then applied to the shaft from any suitable source, causing the same to revolve and the material to be conveyed, being admitted at the upper end, the revolution of the shaft carrying the wings arranged as aforesaid, will cause the material to be conveyed along the trough, and by various adjustments the device may then be arranged, so that it will operate either as a mixer, or as a mixer and conveyer, as will be easily comprehended. When used as a mixer only, the hubs are placed on the shaft in a different manner so as not to form a spiral flange but a series of fans. In this case the material to be mixed is distributed along the trough and the revolution of the shaft as aforesaid mixes it.

What I claim, and desire to secure by Letters Patent, is—

In a mixer and conveyer the combination with the trough A. and shaft B. of two or more hubs C. arranged on said shaft, and having arms D. arranged in pairs upon opposite sides thereof, one of each pair upon one corner of the hub, and its mate diagonally across upon the opposite diagonal corner, each pair of arms provided with a spring actuated wing E. substantially as and for the purposes set forth.

In testimony whereof I affix my signature in presence of two witnesses.

DAVID L. KEELER.

Witnesses:
DENNIS L. ROGERS,
JACOB HOGLE.